US011394812B2

(12) United States Patent
Victor et al.

(10) Patent No.: US 11,394,812 B2
(45) Date of Patent: Jul. 19, 2022

(54) METHODS AND SYSTEMS OF A SOFTWARE DATA DIODE-TCP PROXY WITH UDP ACROSS A WAN

(71) Applicant: Iotium, Inc., Milpitas, CA (US)

(72) Inventors: Ron Victor, Los Gatos, CA (US); Dhawal Tyagi, Saratoga, CA (US); Srivatsan Rajagopal, Cupertino, CA (US); Dhruva Narasimhan, Chennai (IN)

(73) Assignee: Iotium, Inc., Milpitas, CA (US)

( * ) Notice: Subject to any disclaimer, the term of this patent is extended or adjusted under 35 U.S.C. 154(b) by 0 days.

(21) Appl. No.: 16/876,115

(22) Filed: May 18, 2020

(65) Prior Publication Data

US 2021/0084124 A1    Mar. 18, 2021

Related U.S. Application Data

(63) Continuation-in-part of application No. 16/855,223, filed on Apr. 22, 2020.

(Continued)

(51) Int. Cl.
*H04L 29/06* (2006.01)
*H04L 69/164* (2022.01)
(Continued)

(52) U.S. Cl.
CPC ........ *H04L 69/164* (2013.01); *H04L 12/4633* (2013.01); *H04L 63/0435* (2013.01); *H04L 67/2814* (2013.01); *H04L 69/168* (2013.01)

(58) Field of Classification Search
CPC ... H04L 63/0281; H04L 63/029; H04L 67/02; H04L 67/40; H04L 67/104; H04L 69/164;
(Continued)

(56) References Cited

U.S. PATENT DOCUMENTS

| 7,486,695 B1 | 2/2009 | Abdelaziz et al. |
| 2002/0112181 A1* | 8/2002 | Smith ................... H04L 63/105 726/14 |

(Continued)

OTHER PUBLICATIONS

International Pat. Appl. No. PCT/US21/23834, filed on Mar. 24, 2021.

(Continued)

*Primary Examiner* — Mohamed A. Wasel
(74) *Attorney, Agent, or Firm* — Weaver Austin Villeneuve & Sampson LLP; Brian D. Griedel; Ryan Otis (57) ABSTRACT

Disclosed herein are various systems, apparatuses, software, and methods relating to data diode-TCP proxy with a User Datagram Protocol (UDP) across a wide area network (WAN) comprising providing a WAN data diode using a uni-directional semantics protocol, providing a set of data diode proxies in either end of a point-to-point WAN link, providing a symmetric key encryption semantics to extend the WAN data diode securely across a WAN that is specified, wherein the symmetric key encryption semantics are implemented through the set of data diode proxies on either end of the point-to-point WAN link, employing a unidirectional protocol in communication transmitted using the WAN, and, with data diode proxies, terminating one or more data channels on either end of the point-to-point WAN link or transporting a requisite information across the WAN over the uni-directional protocol.

40 Claims, 6 Drawing Sheets

Related U.S. Application Data (60) Provisional application No. 62/837,038, filed on Apr. 22, 2019.

(51) Int. Cl.
*H04L 9/40* (2022.01)
*H04L 69/168* (2022.01)
*H04L 12/46* (2006.01)
*H04L 67/563* (2022.01)

(58) Field of Classification Search
CPC ............. H04L 12/4633; H04L 63/0435; H04L 67/2814; H04L 63/168
See application file for complete search history.

(56) References Cited

U.S. PATENT DOCUMENTS

| | | |
|---|---|---|
| 2006/0282887 A1 | 12/2006 | Trumper et al. |
| 2007/0022289 A1 | 1/2007 | Alt et al. |
| 2010/0027563 A1 | 2/2010 | Padhye et al. |
| 2010/0290476 A1* | 11/2010 | Brindle ............... H04L 63/0209 370/401 |
| 2015/0244788 A1 | 8/2015 | Fausak et al. |
| 2015/0264056 A1* | 9/2015 | Mevec .................. G06F 21/604 726/3 |
| 2015/0351145 A1 | 12/2015 | Burks et al. |
| 2017/0295141 A1 | 10/2017 | Thubert et al. |
| 2017/0374027 A1* | 12/2017 | Fischer ............... H04L 63/0218 |
| 2018/0069773 A1 | 3/2018 | Verma |
| 2018/0115528 A1 | 4/2018 | Rotvold et al. |
| 2018/0176102 A1 | 6/2018 | Bansal et al. |
| 2018/0191681 A1 | 7/2018 | Mihelich et al. |
| 2019/0182213 A1 | 6/2019 | Saavedra et al. |
| 2019/0260831 A1 | 8/2019 | Milev et al. |
| 2019/0327086 A1* | 10/2019 | Slowik .................. H04L 9/3247 |
| 2019/0394170 A1 | 12/2019 | Shameli-Sendi et al. |
| 2020/0033839 A1* | 1/2020 | Messinger ............ H04L 67/125 |
| 2020/0045081 A1 | 2/2020 | Ritchey et al. |
| 2020/0092254 A1 | 3/2020 | Goeringer et al. |
| 2020/0389469 A1 | 12/2020 | Litichever et al. |
| 2021/0084012 A1* | 3/2021 | Victor .................... H04L 67/40 |

OTHER PUBLICATIONS

Schratt M., "HTTP Tunnel," Attack, HACKIN9, Jan. 2009, 6 pages, Retrieved from the Internet: URL: http://www.nocrew.org/software/httptunnel.html.

Sookocheff K., "How Do Websockets Work?," Apr. 4, 2019, 6 pages, Retrieved from the Internet: URL: https://sookocheff.com/post/networking/how-does-tcp-work/.

U.S. Non Final Office Action dated May 7, 2021 for U.S. Appl. No. 16/855,223.

U.S. Non Final Office Action dated May 12, 2021 for U.S. Appl. No. 16/876,113.

"WebSockets—Quick Guide," TutorialsPoint, 31 pages, Retrieved from the Internet: URL: https://www.tutorialspoint.com/websockets/websockets_quick_guide.htm.

U.S. Final Office Action dated Jan. 26, 2022, in U.S. Appl. No. 16/855,223.

U.S. Final Office Action dated Jan. 26, 2022, in U.S. Appl. No. 16/876,113.

* cited by examiner

METHODS AND SYSTEMS OF A SOFTWARE DATA DIODE-TCP PROXY WITH UDP ACROSS A WAN

CROSS-REFERENCE TO RELATED APPLICATIONS

This application claims priority to U.S. application Ser. No. 16/855,223, titled and METHODS AND SYSTEMS OF A MACHINE ACCESS FIREWALL filed on 22 Apr. 2020. U.S. application Ser. No. 16/855,223 claims priority to U.S. Provisional Application No. 62/837,038, titled and METHODS AND SYSTEMS OF A HYBRID-CLOUD OT NETWORK filed on 22 Apr. 2019. This provisional application is incorporated by reference in its entirety.

BACKGROUND

1. Field

This application relates generally to computer networking, and more specifically to a system, article of manufacture and method for implementing a software data diode-TCP proxy with UDP across a WAN.

2. Related Art

Machines are used in everyday manufacturing, building automation and industrial automation tasks. For security reasons, access to these machines may be restricted to local physical access (e.g. air-gapped). There is a need to reduce costs of machine operations. A model of choice is to do so remotely either via Internet or a Private WAN Network. Security by isolation may be prohibitively expensive for this class of applications. Traditional IT-based remote connectivity technologies such as VPN and agent-based solutions have been designed for office and data center and site-to-site environments and does no to operationally scale to be deployed and managed in a distributed non-IT enabled environments. The control plane overhead on maintaining the Privacy and Authentication aspects of the security is so expensive that largely that is left unmanaged—leading to loss of data plane security due to inadequate management.

Moreover; data diodes are generally hardware devices used in the industrial environment to restrict and guarantee flow of information one way. Typically, this is used for data extraction from critical infrastructure devices while eliminating the risk of malware traversing in the opposite direction into those devices. Applications are often being hosted in the cloud and similar semantics is currently not available across the WAN/Internet when devices connect to the remote applications.

BRIEF SUMMARY OF THE INVENTION

In one aspect, a computerized method for implementing a software data diode-TCP proxy with a User Datagram Protocol (UDP) across a wide area network (WAN) comprising. The method includes the step of providing a WAN data diode using a uni-directional semantics protocol. The method includes the step of providing a set of data diode proxies in either end of a point-to-point WAN link. The method includes the step of providing a symmetric key encryption semantics to extend the WAN data diode securely across a specified WAN, wherein the symmetric key encryption semantics are implemented through the set of data diode proxies on either end of the point-to-point WAN link. The method includes the step of employing a uni-directional protocol in the WAN communication. The method includes the step of, with data diode proxies, terminating one or more data channels on either end of the point-to-point WAN link or transporting a requisite information across the WAN over the uni-directional protocol.

BRIEF DESCRIPTION OF THE DRAWINGS

The Figures described above are a representative set and are not an exhaustive with respect to embodying the invention.

DESCRIPTION

Disclosed are a system, method, and article of manufacture of a software data diode-TCP proxy with UDP across a WAN. the following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Data diode can be a network appliance or device that allows data to travel in only one direction.

Destination network address translation (DNAT) is a technique for transparently changing the destination IP address of an end route packet and performing the inverse function for any replies. Any router situated between two endpoints can perform this transformation of the packet.

Edge device is a device which provides an entry point into differently managed enterprise or service provider core networks, such as, inter alia: such as an enterprise IT network or Service Provider Core network. Examples include routers, routing switches, integrated access devices (IADs), multiplexers, and a variety of metropolitan area network (MAN) and wide area network (WAN) access devices. Edge devices also provide connections into carrier and service provider networks or connections between OT and Enterprise IT networks.

Industrial Internet of Things (IIoT) refers to interconnected sensors, instruments, and other devices networked together with computers' industrial applications, including, but not limited to, manufacturing and energy management. This connectivity enables data collection, exchange and analysis, potentially facilitating improvements in productivity and efficiency as well as other economic benefits.

Internet of things (IoT) extends Internet connectivity into physical devices and various objects. Embedded with electronics, Internet connectivity, and other forms of hardware (e.g. sensors), these devices can communicate and interact with others over the Internet, and they can be remotely monitored and controlled.

Key management refers to management of cryptographic keys in a cryptosystem. This can include dealing with the generation, exchange, storage, use, crypto-shredding (e.g. destruction) and replacement of keys. It can include cryptographic protocol design, key servers, user procedures, and/or other relevant protocols.

Operational Technology (OT) includes the hardware and software dedicated to detecting or causing changes in physical processes through direct monitoring and/or control of physical devices.

Operational Technology (OT) Proxies are boundary devices which implement and enforces the necessary protocol translation and security semantics needed for interconnected OT network elements (devices and applications) to talk to each other, often through and over a different network—such as an Enterprise IT network or third-party carrier and service provider networks.

Proxy authentication can serve as access-control. Proxy authentication can provide a mechanism that blocks requests for content until a valid access-permission credentials to the proxy is provided.

Remote procedure call (RPC) is when a computer program causes a procedure (e.g. subroutine) to execute in a different address space (e.g. on another computer on a shared network), which is coded as if it were a normal (e.g. local) procedure call, without the programmer explicitly coding the details for the remote interaction.

Stream is a sequence of data elements made available over time.

Transmission Control Protocol (TCP) is one of the main protocols of the Internet protocol suite. TCP provides reliable, ordered, and error-checked delivery of a stream of octets (bytes) between applications running on hosts communicating via an IP network.

Tunneling protocol can be a communications protocol that allows for the movement of data from one network to another. It can involve allowing a private network communication to be sent across a public network.

User Datagram Protocol (UDP) is one of the core members of the Internet protocol suite used by computer applications to send messages (e.g. datagrams) to other hosts on an Internet Protocol (IP) network. Prior communications are not required in order to set up communication channels or data paths.

Example Methods

Figure 1:
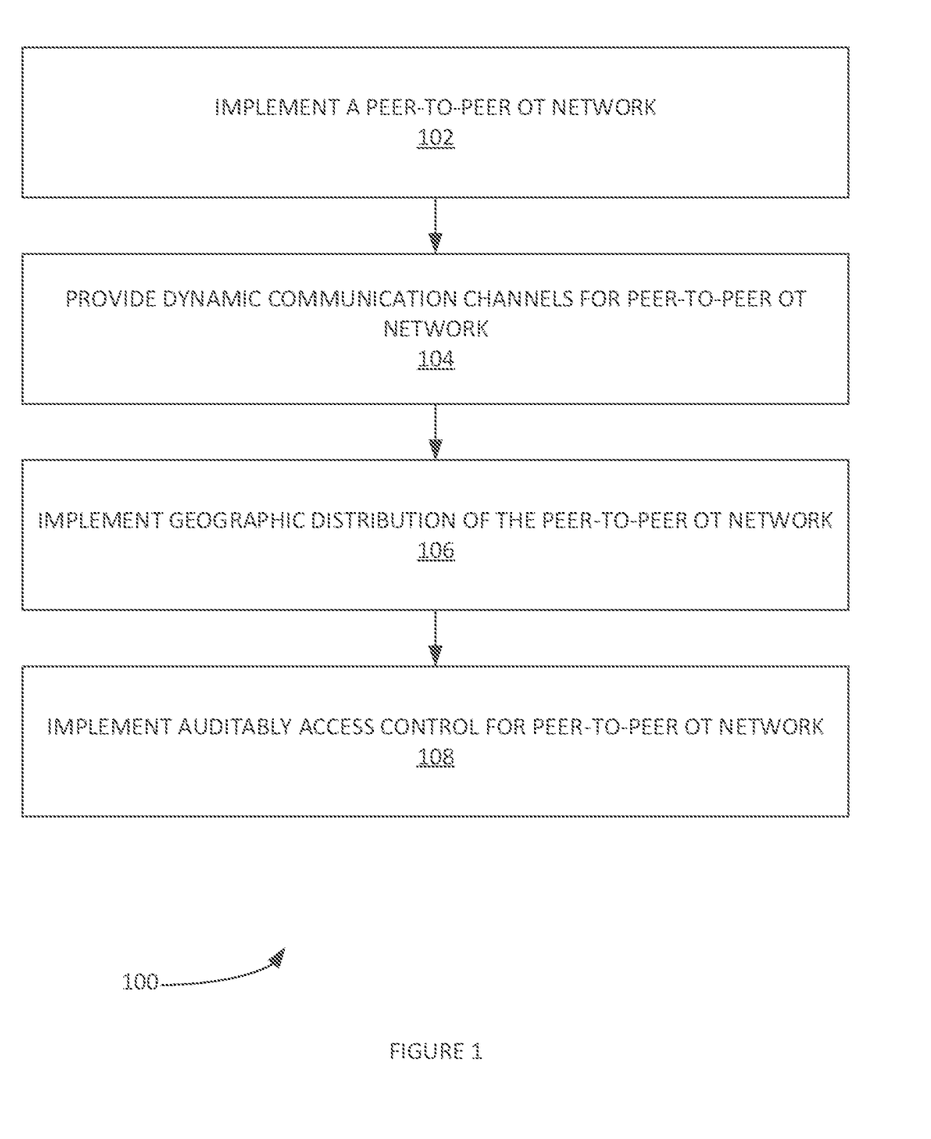
FIG. 1 illustrates an example process for implementing a hybrid-cloud OT network, according to some embodiments.

FIG. 1 illustrates an example process 100 for implementing a hybrid-cloud OT network, according to some embodiments. In step 102, process 100 provides a hybrid-cloud OT network that can scale to n-number segmented communication channels (e.g. hundreds of thousands of segmented communication channels, etc.). In step 104, process 100 can provide dynamic communication channels for hybrid-cloud OT network. These communication channels are not necessarily always-on. In step 106, process 100 can implement geographic distribution of the hybrid-cloud OT network. For example, the hybrid-cloud OT network can be distributed to the geographic locations of machines, applications and humans. In step 108, process 100 can implement auditable access control for hybrid-cloud OT network. This can be done for security and compliance. The hybrid-cloud OT network minimal operational overhead. Process 100 can connect OT networks in one location to those in other locations (e.g. a factory floor, building, public cloud, private data center, etc.

Machine Access Firewall: Comprehensive Access Control for Mission Critical Industrial Machines by Humans and Applications It is noted that OT-Proxies can be implemented. OT-Proxies provide a scalable solution and utilize a converged firewall. OT-Proxies can be used to connect people, applications and machines in a secure, controlled and auditable manner in a distributed, micro-network, multi-tenanted environment. OT-Proxies can be implemented in brownfield networks and/or device environments with no additional forklift upgrade of the already functional end devices and applications. In addition, OT-Proxies can increase operational efficiency of a system where the privacy and authentication aspects of security for the system are covered automatically.

Example of OT technologies include, inter alia: converting one type of network (e.g. a serial network to ethernet) to another, converting Modbus based messages to time series based JSON messages, enforcing that only specific protocols are allowed and rest are blocked etc.

Figure 2:
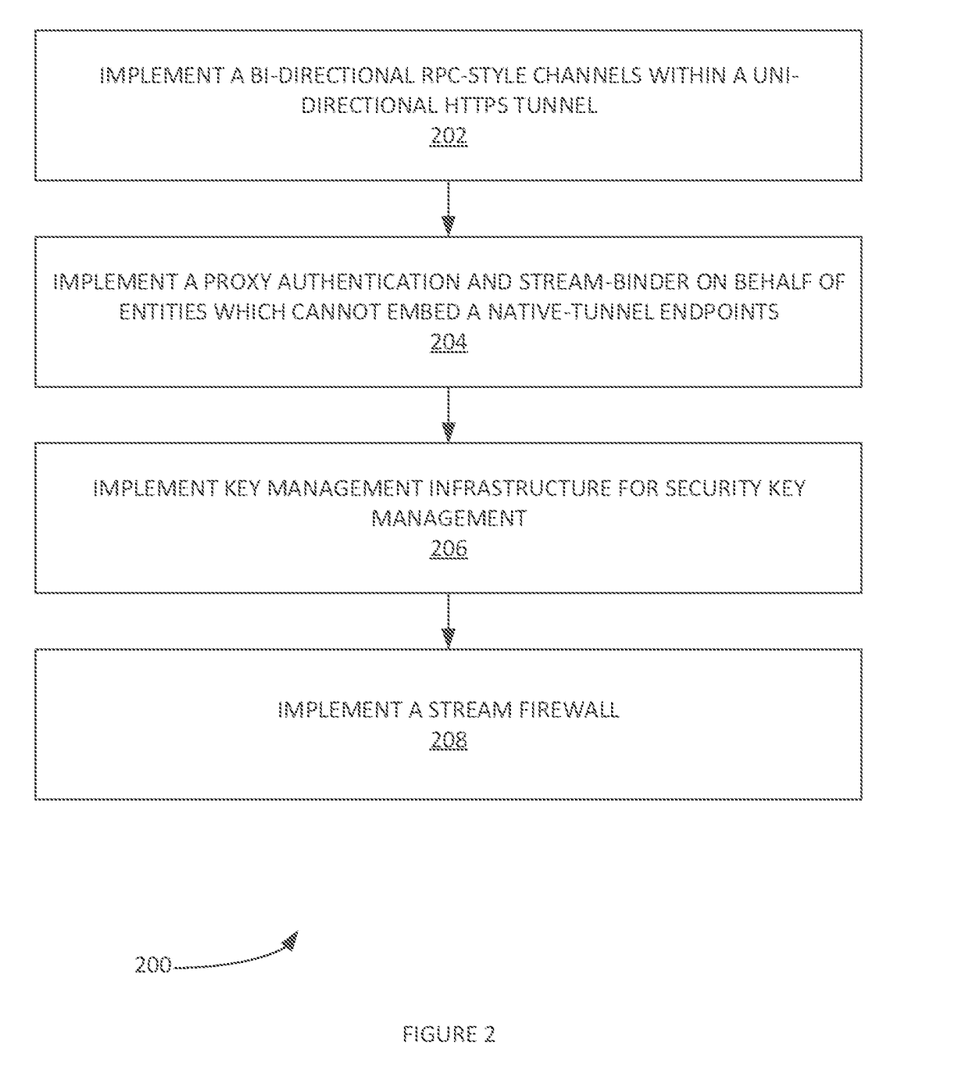
FIG. 2 illustrates an example process for implementing OT-Proxies, according to some example embodiments.

FIG. 2 illustrates an example process 200 for implementing machine identity firewall, according to some example embodiments. In step 202, process 200 can implement a bi-directional RPC-style channels within a uni-directional HTTPS tunnel. This model can be used for both local and remote connectivity. Tunnel end points are at each application and machine with which to connect in a peer-to-peer format. Peer-to-peer communication channels lends itself well to both segmented and scalable implementation.

In step 204, process 200 can implement a proxy authentication and stream-binder on behalf of entities which cannot embed a native-tunnel endpoints. The proxy end points convert one authentication format to another and bridges one communication path to the next. This can be used for an implementation in brownfield environments (e.g. an asset base of millions of machines, legacy applications, etc.).

In step 206, process 200 can implement key management infrastructure for security key management. This can eliminate IT department's overhead associated with it.

In step 208, process 200 can implement a stream firewall. The stream firewall provides access control on a segmented per-stream basis (e.g. a human access stream, an application stream for each end device, etc.).

Software Data Diode—TCP Proxy with UDP Across the WAN—Extending Conceptual Data Diodes Across the Internet It is noted that data diodes are hardware devices used in an industrial environment to restrict and guarantee flow of information one way. For example, data diodes can be used for data extraction from critical infrastructure devices while eliminating the risk of malware traversing in the opposite direction into those devices. Applications can be hosted in a cloud-computing platform and similar semantics may not be available across a WAN/Internet when devices connect to the remote applications.

Figure 3:
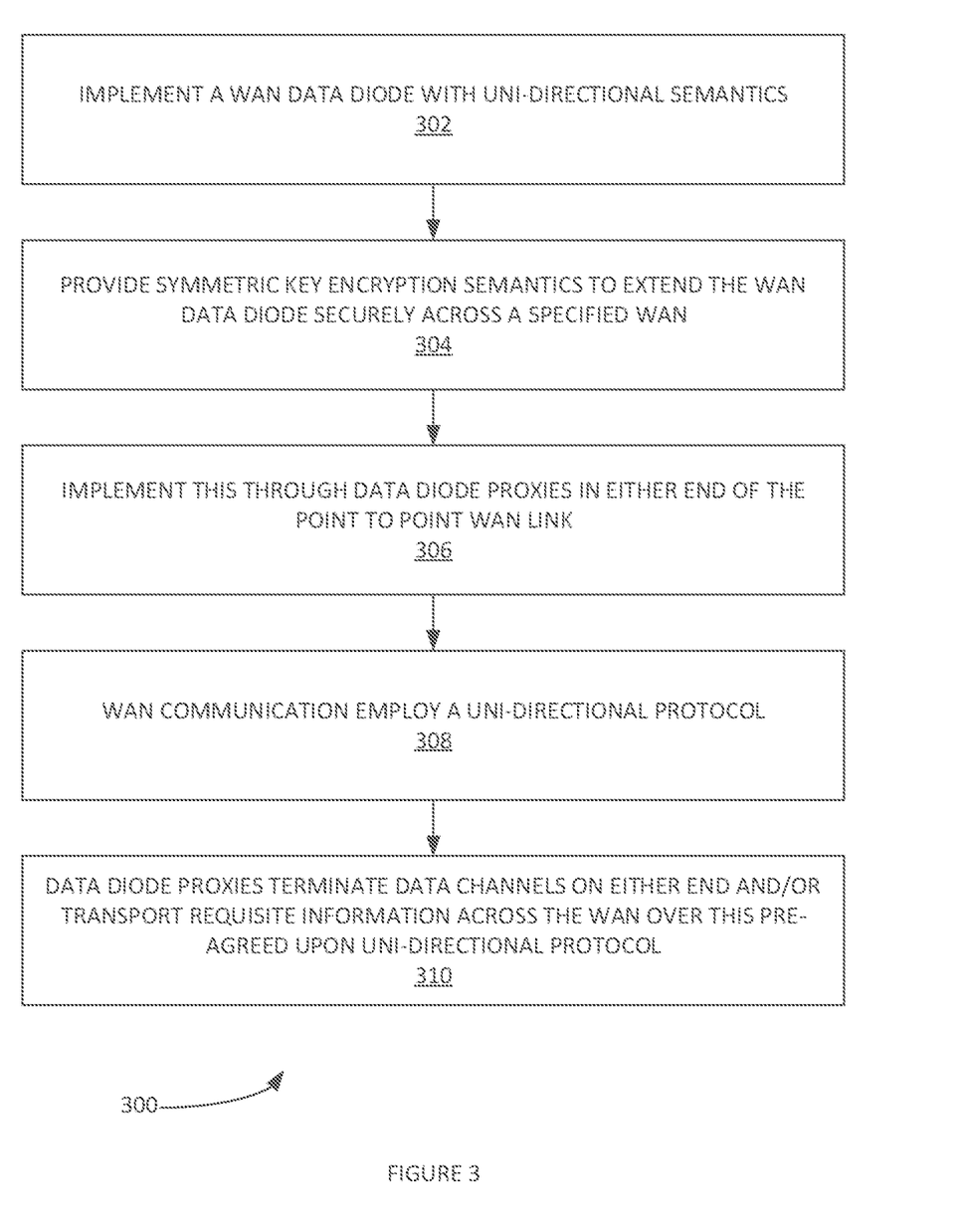
FIG. 3 illustrates an example process for implementing a WAN data diode with the same uni-directional semantics, according to some embodiments.

FIG. 3 illustrates an example process 300 for implementing a WAN data diode with the same uni-directional semantics, according to some embodiments. In step 302, process 300 can implement a WAN data diode with uni-directional semantics. In step 304, process 300 can provide symmetric key encryption semantics to extend the WAN data diode securely across a specified WAN. A semantic network can be a knowledge base that represents semantic relations between concepts in a network (e.g. in terms of a diode semantic, a secure proxy semantic, etc.).

In step 306, process 300 can implement this through data diode proxies in either end of the point to point WAN link. A point-to-point WAN link can provide basic network connectivity between two sites, for example. The proxies at both ends communicate with each other across the WAN via an encapsulating Uni-directional protocol. Bi-directional protocols such as TCP is inherently is bi-directional (e.g. with Acks flowing the other direction). In order to eliminate any back channel, the WAN communication employ a uni-directional protocol in step 308. An example uni-directional protocol can include UDP. Process 300 can pack/unpack the data formats into the uni-directional protocol encapsulation.

In step 310, the data diode proxies terminate data channels on either end and/or transport requisite information across the WAN over this pre-agreed upon uni-directional protocol. This change in carrier can be used to eliminate direct communication between the two ends (e.g. a device end and application end) and thereby enforcing both a diode semantic and a secure proxy semantic (e.g. including additional encryption).

Automatic Centralized Firewall for Industrial IOT WAN Fabric

Figure 4:
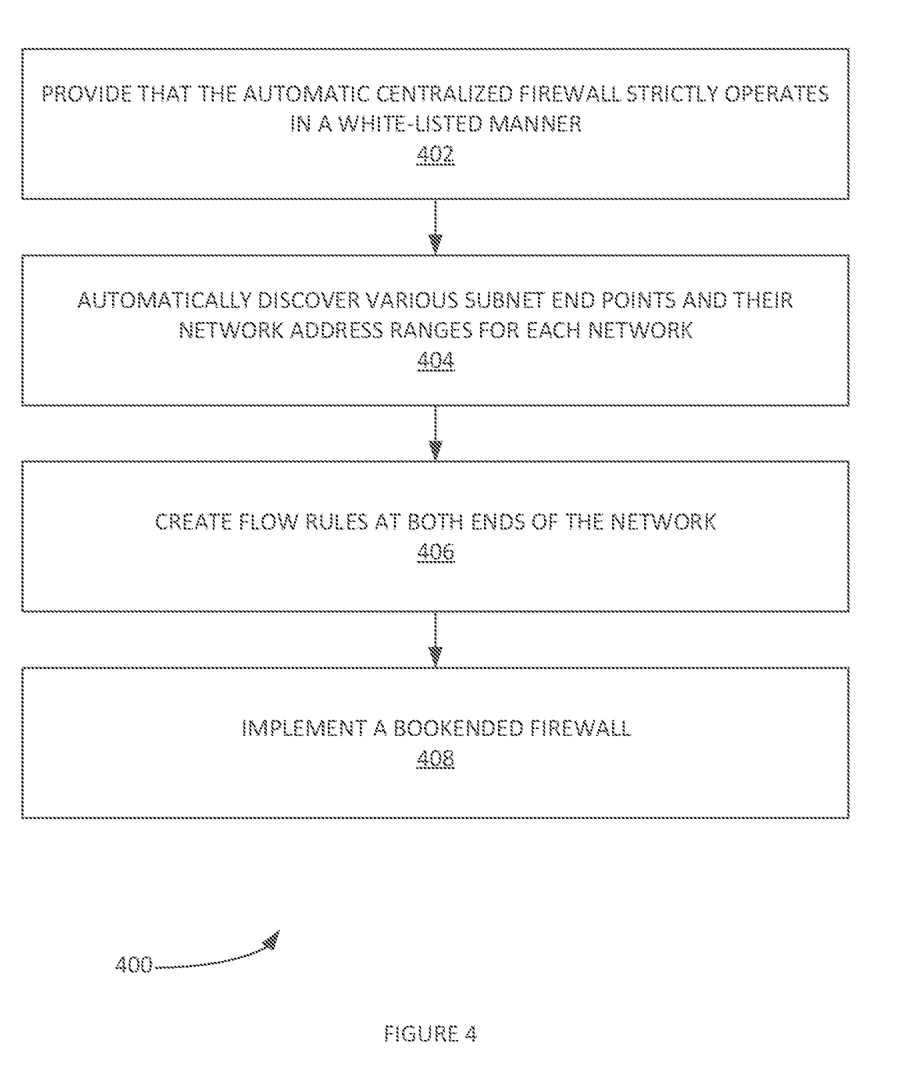
FIG. 4 illustrates an example process for implementing an automated centralized firewall for industrial IOT wan fabric, according to some embodiments.

FIG. 4 illustrates an example process 400 for implementing an automatic centralized firewall for industrial IOT WAN fabric, according to some embodiments. Process 400 can provide a centralized cloud-managed auto-learning micro-network firewalls for large scale WAN distributed machine and application networks. In step 402, process 400 provides that the automatic centralized firewall strictly operates in a white-listed manner. In step 404, process 400 automatically discovers various subnet end points and their network address ranges for each network. In step 406, process 400 creates flow rules at both ends of the network. This can be from the machine network end and from the remote access networks. In step 408, process 400 implements a bookended firewall. Process 400 can eliminate DDOS of the WAN fabric while providing appropriate access control to machines and applications. Process 400 can have a low rollout and low deployment costs. Process 400 can be implemented with COTS hardware. Process 400 can centralize control and distributes enforcement. Process 400 can provide both firewall and DDOS protection at the same time.

Application Migration Across the WAN

Figure 5:
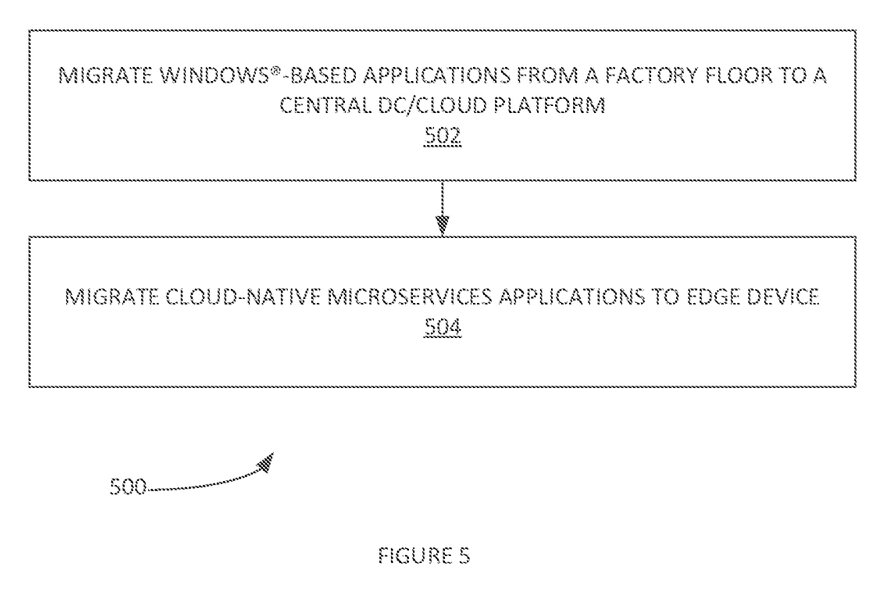
FIG. 5 illustrates an example process for implementing application migration across the wan, according to some embodiments.

FIG. 5 illustrates an example process 500 for implementing application migration across the wan, according to some embodiments. Process 500 provides a mechanism for secure application migration. Process 500 can leverage the same channels used to migrate data securely. Process 500 can automatically reuse cloud-based applications at an edge device and vice versa. Process 500 can implement application migration in an industrial context. In step 502, process 500 can migrate Windows®-based applications from a factory floor to a central DC/Cloud platform. In step 504, process 500 can migrate cloud-native microservices applications to edge device. Process 500 does not mandate changes/rewrite of the applications. Process 500 does not implement invasive changes to network planning or configuration. Process 500 can provide OT-Proxies integrated with edge compute system to facilitate migration of applications across the WAN.

It is noted that application migration across the WAN (e.g. from factory to Cloud and vice versa) can be enforced without changes to management and ownership of the application. Process 500 can facilitate the management and operations of such applications is the separation of the infrastructure layer from the Application runtime. Process 500 provides a multi-tenant management such that the data scientist can own and manage the application without having to take on additional ownership and management overhead of the infrastructure in the factory floor (e.g. can be left to the network and security teams, etc.).

Additional Methods and Systems

Figure 6:
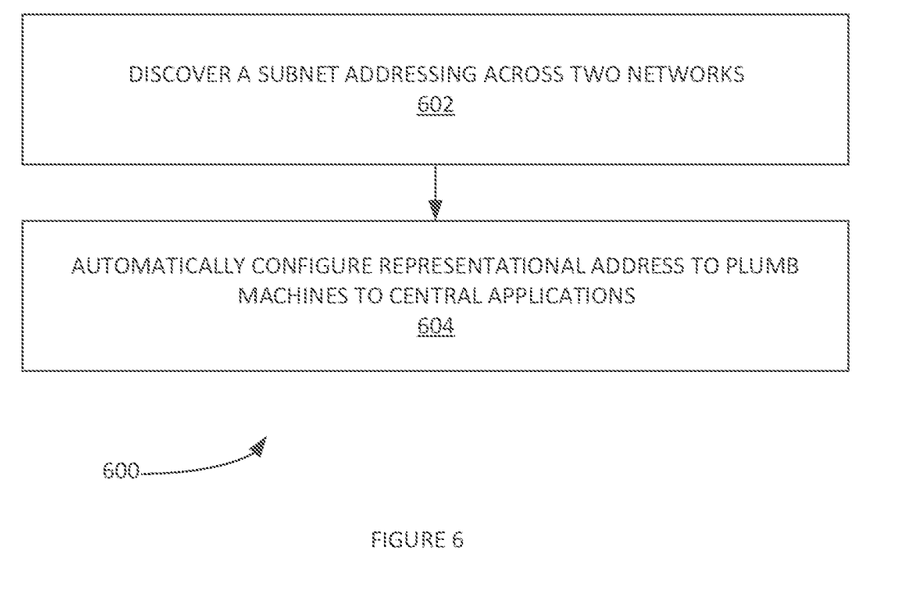
FIG. 6 illustrates an example process for zero touch plumbing of independent private networks for scalable hub and spoke IIoT deployments.

FIG. 6 illustrates an example process 600 for zero touch plumbing of independent private networks for scalable hub and spoke IIoT deployments (e.g. discovery and mutual Static Network Address Translation (SHA1)/GNAT). In step 602, process 600 can discover a subnet addressing across two networks. In step 604, process 600 can automatically configure representational address to plumb machines to central applications. Process 600 provides a scalable deployment model for IPv4 based large scale building networks.

Process 600 can represent remote networks differently. Process 600 can prevent/reduce cost of forklift upgrade to IPv6 for scale.

Late binding labels for rapid deployment at scale can be implemented. This can be done by decoupling actual resources from configuration schemas to allow for late bind deployments.

Per machine independent keys for data plane and management plane can be implemented. Edge strategy can be implemented to solve this problem in locations where physical device security is solved as opposed to per device keys. Machine management can be decoupled from data acquisition. There can be complete separation of the operation plane and data plane.

Risk mitigation and incremental migration of automation services to a cloud-platform can be provided. Single-click network sharing across disparate organizations/third parties and machine interfaces can be extended across untrusted networks. OT-Proxies for IIoT can be provided as a secure model for onboarding air-gapped brownfield assets to the Internet/WAN.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method for implementing a software data diode-TCP proxy with a User Datagram Protocol (UDP) across a Wide Area Network (WAN), the method comprising:
   (a) providing a WAN data diode using a uni-directional semantics protocol;
   (b) providing a set of data diode proxies in either end of a point-to-point WAN link;
   (c) providing a symmetric key encryption semantics to extend the WAN data diode securely across a WAN that is specified, wherein the symmetric key encryption semantics are implemented through the set of data diode proxies on either end of the point-to-point WAN link;
   (d) employing a uni-directional protocol in communication transmitted using the WAN; and
   (e) with data diode proxies, (i) terminating one or more data channels on either end of the point-to-point WAN link or (ii) transporting a requisite information across the WAN over the uni-directional protocol.

2. The method of claim 1, wherein the set of data diode proxies are disposed at both ends of the of the point-to-point WAN link.

3. The method of claim 2, wherein the set of data diode proxies communicate with each other across the WAN via an encapsulating uni-directional protocol.

4. The method of claim 3, wherein the communication transmitted using the WAN employs the uni-directional protocol to pack or unpack all data formats into the uni-directional protocol encapsulation.

5. The method of claim 4, wherein the uni-directional protocol comprises a pre agreed upon uni-directional protocol.

6. The method of claim 5, wherein a back channel in the communication transmitted using the WAN is eliminated by employing the uni-directional protocol in the communication transmitted using the WAN.

7. The method of claim 1, wherein a carrier change is used to eliminate direct communication between a device end and an application end of the point-to-point WAN link.

8. The method of claim 7, wherein (I) a diode semantic and (II) a secure proxy semantic are used by (A) the device end and (B) the application end of the point-to-point WAN link.

9. A system useful for implementing a software data diode-TCP proxy with a User Datagram Protocol (UDP) across a Wide Area Network (WAN), the system comprising:
   a processor;
   a memory containing instructions when executed on the processor, cause the processor to perform operations comprising:
   (a) providing a WAN data diode using a uni-directional semantics protocol;
   (b) providing a set of data diode proxies in either end of a point-to-point WAN link;
   (c) providing a symmetric key encryption semantics to extend the WAN data diode securely across a WAN that is specified, wherein the symmetric key encryption semantics are implemented through the set of data diode proxies on either end of the point-to-point WAN link;
   (d) employing a uni-directional protocol in communication transmitted using the WAN; and
   (e) with data diode proxies, (i) terminating one or more data channels on either end of the point-to-point WAN link or (ii) transporting a requisite information across the WAN over the uni-directional protocol.

10. The system of claim 9, wherein the set of data diode proxies are disposed at both ends of the of the point-to-point WAN link.

11. The system of claim 10, wherein the set of data diode proxies communicate with each other across the WAN via an encapsulating uni-directional protocol.

12. The system of claim 11, wherein the communication transmitted using the WAN employs the uni-directional protocol to pack or unpack a data format into the uni-directional protocol encapsulation.

13. The system of claim 12, wherein the uni-directional protocol comprises a pre_agreed upon uni-directional protocol.

14. The system of claim 13, wherein a back channel in the communication transmitted using the WAN is eliminated by employing the uni-directional protocol in the communication transmitted using the WAN.

15. The system of claim 9, wherein a carrier change is used to eliminate direct communication between a device end and an application end of the point-to-point WAN.

16. The system of claim 15, wherein (I) a diode semantic and (II) a secure proxy semantic, are used by (A) the device end and (B) the application end of the point-to-point WAN.

17. An apparatus for implementing a software data diode-TCP proxy with a User Datagram Protocol (UDP) across a wide area network (WAN), the apparatus comprising:
at least one controller comprising circuitry, the at least one controller configured to operatively coupled to the WAN, the at least one controller being configure to execute operations comprising:
(a) provide, or direct provision of, a WAN data diode using a uni-directional semantics protocol;
(b) provide, or direct provision of, a set of data diode proxies in either end of a point-to-point WAN link;
(c) provide, or direct provision of, a symmetric key encryption semantics to extend the WAN data diode securely across a WAN that is specified, wherein the symmetric key encryption semantics are implemented through the set of data diode proxies on either end of the point-to-point WAN link;
(d) employ, or direct employment of, a uni-directional protocol in communication transmitted using the WAN; and
(e) with data diode proxies, (i) terminate, or direct termination of, one or more data channels on either end of the point-to-point WAN link or (ii) transport, or direct transportation of, a requisite information across the WAN over the uni-directional protocol.

18. The apparatus of claim 17, wherein the at least one controller is configured to use, or direct use of, the set of data diode proxies at both ends of the of the point-to-point WAN link.

19. The apparatus of claim 18, wherein the at least one controller is configured to enable, or direct enablement of, communication of set of data diode proxies with each other across the WAN via an encapsulating uni-directional protocol.

20. The apparatus of claim 19, wherein the at least one controller is configured to employ, or direct employment of, the uni-directional protocol in the communication transmitted using the WAN to pack or unpack a data format into the uni-directional protocol encapsulation.

21. The apparatus of claim 20, wherein the uni-directional protocol comprises a pre agreed upon uni-directional protocol.

22. The apparatus of claim 21, wherein the at least one controller is configured to eliminate, or direct elimination of, a back channel in the communication transmitted using the WAN by employing the uni-directional protocol in the communication transmitted using the WAN.

23. The apparatus of claim 17, wherein the at least one controller is configured to use, or direct use of, a carrier change to eliminate direct communication between a device end and an application end of the point-to-point WAN link.

24. The apparatus of claim 23, wherein the at least one controller is configured to use, or direct use of, (I) a diode semantic and a (II) secure proxy semantic, by (A) the device end and (B) the application end of the point-to-point WAN link.

25. A non-transitory computer readable program instructions for implementing a software data diode-TCP proxy with a User Datagram Protocol (UDP) across a wide area network (WAN), the program instructions, when read by one or more processors operatively coupled to the WAN, cause the one or more processors to execute operations comprising:
(a) providing, or directing provision of, a WAN data diode using a uni-directional semantics protocol;
(b) providing, or directing provision of, a set of data diode proxies in either end of a point-to-point WAN link;
(c) providing, or directing provision of, a symmetric key encryption semantics to extend the WAN data diode securely across a WAN that is specified, wherein the symmetric key encryption semantics are implemented through the set of data diode proxies on either end of the point-to-point WAN link;
(d) employing, or directing employment of, a uni-directional protocol in communication transmitted using the WAN; and
(e) with data diode proxies, (i) terminating, or directing termination of, one or more data channels on either end of the point-to-point WAN link or (ii) transporting, or directing transportation of, a requisite information across the WAN over the uni-directional protocol.

26. The non-transitory computer readable program instructions of claim 25, wherein the operations further comprise using, or directing use of, the set of data diode proxies at both ends of the of the point-to-point WAN link.

27. The non-transitory computer readable program instructions of claim 26, wherein the operations further comprise enabling, or directing enablement of, communication of set of data diode proxies with each other across the WAN via an encapsulating uni-directional protocol.

28. The non-transitory computer readable program instructions of claim 27, wherein the operations further comprise employing, or directing employment of, the uni-directional protocol in the communication transmitted using the WAN to pack or unpack a data format into the uni-directional protocol encapsulation.

29. The non-transitory computer readable program instructions of claim 28, wherein the uni-directional protocol comprises a pre agreed upon uni-directional protocol.

30. The non-transitory computer readable program instructions of claim 29, wherein the operations further comprise eliminating, or directing elimination of, a back channel in the communication transmitted using the WAN by employing the uni-directional protocol in the communication transmitted using the WAN.

31. The non-transitory computer readable program instructions of claim 25, wherein the operations further comprise using, or direct use of, a carrier change to eliminate direct communication between a device end and an application end of the point-to-point WAN link.

32. The non-transitory computer readable program instructions of claim 31, wherein the operations further comprise using, or directing use of, (I) a diode semantic and (II) a secure proxy semantic, by (A) the device end and (B) the application end of the point-to-point WAN link.

33. A system for implementing a software data diode-TCP proxy with a User Datagram Protocol (UDP) across a wide area network (WAN), the system comprising:
the WAN that is configured to:
(a) be implemented on one or more data channels;
(b) facilitate utilization of a WAN data diode using a uni-directional semantics protocol;
(b) operatively couple a set of data diode proxies in either end of a point-to-point WAN link;
(c) transmit a symmetric key encryption semantics to extend the WAN data diode securely across a WAN that is specified, wherein the symmetric key encryption semantics are implemented through the set of data diode proxies on either end of the point-to-point WAN link;
(d) transmit a uni-directional protocol in communication transmitted using the WAN; and
(e) with data diode proxies, (i) terminate the one or more data channels on either end of the point-to-point WAN link or (ii) communicate a requisite information across the WAN over the uni-directional protocol.

34. The system of claim 25, wherein the WAN is configured to use the set of data diode proxies at both ends of the of the point-to-point WAN link.

35. The system of claim 26, wherein the WAN is configured to enable communication of set of data diode proxies with each other across the WAN via an encapsulating uni-directional protocol.

36. The system of claim 27, the WAN is configured to employ the uni-directional protocol in the communication transmitted using the WAN to pack or unpack a data format into the uni-directional protocol encapsulation.

37. The system of claim 28, wherein the uni-directional protocol comprises a pre agreed upon uni-directional protocol.

38. The system of claim 29, wherein the WAN is configured to eliminate a back channel in the communication transmitted using the WAN by employing the uni-directional protocol in the communication transmitted using the WAN.

39. The system of claim 25, wherein the WAN is configured to use a carrier change to eliminate direct communication between a device end and an application end of the point-to-point WAN link.

40. The system of claim 31, wherein the WAN is configured to use (I) a diode semantic and (II) a secure proxy semantic, by (A) the device end and (B) the application end of the point-to-point WAN link.

* * * * *